(12) United States Patent
Tandon et al.

(10) Patent No.: US 10,015,495 B2
(45) Date of Patent: Jul. 3, 2018

(54) GENERATING CUSTOM QUANTIZATION TABLES FOR JPEG COMPRESSION BASED ON IMAGE CONTENT

(71) Applicant: Adobe Systems Incorporated, San Jose, CA (US)

(72) Inventors: Tarun Tandon, New Delhi (IN); Mohd. Yawar Nihal Siddiqui, Delhi (IN); Kshitiz Bakshi, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 52 days.

(21) Appl. No.: 15/150,158

(22) Filed: May 9, 2016

(65) Prior Publication Data

US 2017/0324958 A1 Nov. 9, 2017

(51) Int. Cl.
| | |
|---|---|
| H04N 19/136 | (2014.01) |
| H04N 19/124 | (2014.01) |
| H04N 19/172 | (2014.01) |
| H04N 19/625 | (2014.01) |
| H04N 19/186 | (2014.01) |
| H04N 19/176 | (2014.01) |

(52) U.S. Cl.
CPC ........ *H04N 19/136* (2014.11); *H04N 19/124* (2014.11); *H04N 19/172* (2014.11); *H04N 19/176* (2014.11); *H04N 19/186* (2014.11); *H04N 19/625* (2014.11)

(58) Field of Classification Search
None
See application file for complete search history.

(56) References Cited

U.S. PATENT DOCUMENTS

| | | | | |
|---|---|---|---|---|
| 5,426,512 A | * | 6/1995 | Watson | H04N 19/176 375/E7.13 |
| 5,677,689 A | * | 10/1997 | Yovanof | H04N 19/176 341/50 |
| 5,987,177 A | * | 11/1999 | Nishida | G06T 9/00 382/232 |
| 6,018,303 A | * | 1/2000 | Sadeh | H03M 7/3084 341/51 |
| 6,483,538 B2 | * | 11/2002 | Hu | G06T 7/32 348/180 |
| 6,643,402 B1 | * | 11/2003 | Okada | H04N 19/176 382/232 |

(Continued)

FOREIGN PATENT DOCUMENTS

EP 0784312 A2 * 7/1997 ......... G10L 19/0212

*Primary Examiner* — Michelle M Entezari
(74) *Attorney, Agent, or Firm* — Keller Jolley Preece

(57) ABSTRACT

Methods and systems for compressing images include generating custom quantization tables for quantizing frequency information associated with an image. Specifically, one or more embodiments determine acceptable error percentages during compression of a digital image based on content of the digital image. For example, the acceptable error percentages are defined by compression error thresholds that limit how much error a quantizer in a quantization table can introduce during compression of the digital image. One or more embodiments generate the custom quantization table by determining quantizer values that produce compression errors that meet the compression error thresholds. One or more embodiments compress the digital image using the custom quantization table.

20 Claims, 10 Drawing Sheets

(56) References Cited

U.S. PATENT DOCUMENTS

| | | | |
|---|---|---|---|
| 6,963,606 B1* | 11/2005 | Yanagihara | H04N 19/56 375/240.01 |
| 7,881,545 B2* | 2/2011 | Yamamoto | H04N 19/176 358/3.13 |
| 8,081,682 B1* | 12/2011 | Carbacea | H04N 19/176 375/240.24 |
| 8,351,723 B2* | 1/2013 | Richter | H04N 19/149 382/248 |
| 9,641,848 B2* | 5/2017 | Lei | H04N 19/154 |
| 2006/0291720 A1* | 12/2006 | Malvar | H04N 1/64 382/166 |
| 2010/0177891 A1* | 7/2010 | Keidar | H04N 5/913 380/200 |
| 2010/0290532 A1* | 11/2010 | Yamamoto | H04N 19/176 375/240.16 |
| 2010/0310187 A1* | 12/2010 | Yang | H04N 19/647 382/248 |
| 2015/0163485 A1* | 6/2015 | Lin | H04N 19/52 375/240.16 |

* cited by examiner

| 350.2 | 103.7 | 69.7 | 55.54 | 50.27 | 49.55 | 46.18 | 47 |
|---|---|---|---|---|---|---|---|
| 85.23 | 61.44 | 44.5 | 35.25 | 30 | 28.5 | 26.75 | 26.28 |
| 54.6 | 50.32 | 40.3 | 30.52 | 25.94 | 25.07 | 25.13 | 23.45 |
| 36.7 | 42.84 | 38.3 | 29.83 | 23.96 | 24.23 | 25.01 | 22.05 |
| 27.04 | 35.96 | 37.5 | 31.19 | 22.78 | 25.08 | 24.09 | 19.6 |
| 24.01 | 28.82 | 35.6 | 34.56 | 25.45 | 28.34 | 24.25 | 18.69 |
| 21.26 | 22.88 | 30.1 | 35.76 | 27.67 | 28.89 | 21.73 | 16.99 |
| 20.07 | 23.53 | 25.2 | 36.64 | 30.94 | 29.82 | 19.85 | 17.06 |

*Fig. 5*

GENERATING CUSTOM QUANTIZATION TABLES FOR JPEG COMPRESSION BASED ON IMAGE CONTENT

BACKGROUND AND RELEVANT ART

Digital image compression decreases the storage size of digital images. Digital image compression is particularly useful when storing or transmitting large numbers of images, or when transmitting images over network connections. A common compression method standard that many image processing systems use is the JPEG standard. JPEG compression is a lossy compression standard that trades off image quality for image size. Thus, as JPEG compression increase the amount of compression, the image quality decreases. As such, high JPEG compression can cause image artifacts that cause an image to lose significant amounts of visible detail.

To provide a balance between image quality loss and image compression, some conventional image processing systems provide a plurality of different preset compression configurations. Specifically, users may select from the preset compression configurations to obtain different amounts of compression and image quality. For example, often the preset compression configurations are based on research associated with the human psychovisual system that determines how much detail humans can see in accordance with different visual properties of images. To illustrate, when compressing an image using JPEG compression, a user can select an image quality or compression amount with corresponding preset compression configurations.

Although preset compression configurations provide some flexibility in allowing a user to modify compression amounts and image quality, such preset compression configurations have limitations. In particular, preset compression configurations often produce significant quality differences based on the content of images. For example, applying a preset compression configuration associated with a selected image compression amount can result in very different visual fidelity with significantly different storage sizes when applied to different images with different content. Similarly, applying a preset compression configuration associated with a selected image compression amount can result in very different visual fidelity for different areas within a single image based on the content in the different areas. Thus, although preset compression configurations provide some amount of flexibility and customization, preset compression configurations are not reliable for producing consistent visual fidelity, and can also result in wasted storage space and excessive loading/transfer times.

Additionally, some conventional image processing systems allow users to manually select an image quality (compression amount) when saving an image as a JPEG file. Manual selection of image quality for many images, however, can be difficult and time-consuming. More specifically, for use cases involving many images (e.g., web storage of multiple images), manually selecting the proper compression settings for each image requires significant amounts of time. On the other hand, performing batch processes by allowing a user to manually select a single preset compression configuration for a plurality of images produces inconsistent image qualities, as previously mentioned. Thus, manual selection of preset compression settings is often a significant time investment or results in inconsistent image fidelity.

These and other disadvantages may exist with respect to conventional image compression techniques.

SUMMARY

Introduced here are techniques/technology for compressing digital images. One or more embodiments include systems and methods for compressing images based on the content of the images. Specifically, the systems and methods use content information from an image to determine an amount of error that will produce a consistent visual quality throughout the various portions of the image when using JPEG compression. For example, the systems and methods identify error thresholds for different portions of the image based on the effect on the visual fidelity of the image. The systems and methods generate a custom quantization table that constrains compression errors to the error thresholds for the various portions. Thus, the custom quantization table allows for JPEG compression that increases compression while simultaneously reducing noticeable compression errors.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 5 illustrates a graph diagram of a matrix including a plurality of frequency domain coefficients in a matrix in accordance with one or more embodiments;

DETAILED DESCRIPTION

Figure 1A:
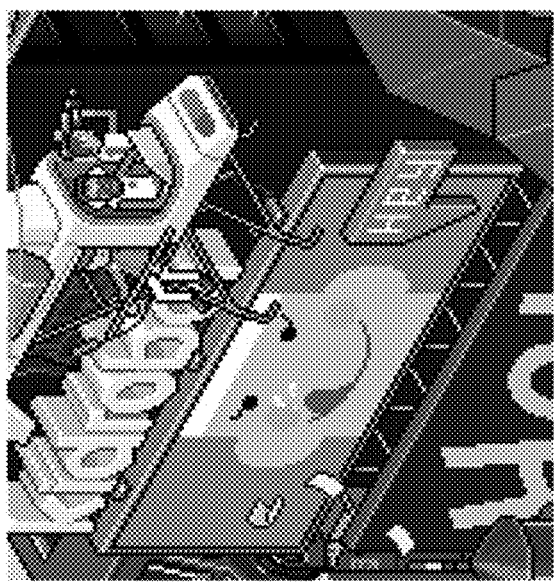
FIGS. 1A-1B illustrate a source image and a version of the source image compressed using conventional JPEG compression methods.

One or more embodiments of the present disclosure include an image processing system for compressing digital images based on content of the digital images. Specifically, the image processing system uses content information from an image to determine an amount of error that will produce a consistent visual quality throughout the image using JPEG compression. For example, the image processing system identifies error thresholds for different frequency components of the image based on the effect of the frequency components on the visual fidelity of the image. The image processing system generates a custom quantization table that constrains compression errors to the error thresholds to achieve a quality setting for a selected workflow. By limiting compression errors in an image to the error thresholds for the selected compression setting, the image processing system provides a consistent visual fidelity within the image and relative to a plurality of other images with the same quality setting.

The image processing system identifies details at different frequencies of an image that should be retained during compression to take advantage of certain aspects of the human visual system. More specifically, the human eye is more capable of detecting low frequency changes than high frequency changes. For example, removing high frequency information from an image may result in an image that looks approximately the same to the human eye, while removing low frequency information from the image may result in an image that looks significantly different to the human eye. By identifying the frequencies that affect the visual fidelity the least, the image processing system determines an importance of the frequencies to the image.

To identify important content in the image, the image processing system averages frequency information of an image. In particular, the image processing system first converts a plurality of blocks of the image (e.g., 8×8 pixel blocks) to a frequency domain using a discrete cosine transform (DCT) and averages frequency coefficients in the frequency information across the entire image. The image processing system analyzes the averaged frequency coefficients for the image to determine how each coefficient affects the overall visual quality of the image.

After analyzing the averaged frequency coefficients to identify the importance of each coefficient to the overall image quality, the image processing system determines an amount of error that the system can introduce into a compressed version of the image. Specifically, the image processing system places each coefficient into one of a plurality of buckets (i.e., coefficient groups) according to the identified importance of the coefficients. Each bucket has a corresponding error threshold that determines a maximum error percentage (or an approximated maximum error percentage) that the image processing system will allow when compressing the image.

According to one or more embodiments, the image processing system determines the error thresholds for the coefficients based on the image content and a selected workflow. For example, the image processing system identifies a quality setting for a selected workflow that indicates a required visual fidelity in accordance with empirical data associated with the human vision system. The image processing system then assigns a lowest error threshold to a bucket including the most important frequency coefficients (e.g., a high priority bucket) and a higher error threshold to a bucket including less important frequency coefficients (e.g., a low priority bucket), etc. Thus, the image processing system prioritizes frequency changes based on how the frequencies affect the visual fidelity of the image. Additionally, because the image processing system uses empirical data to determine different error thresholds for different buckets, the image processing system can apply similar error thresholding to a plurality of different images to produce custom results based on the content of the images.

The image processing system then generates a quantization table for compressing the image. Specifically, the image compression table uses the determined error thresholds to assign quantizers to the coefficients in the different buckets. For example, the image processing system determines the maximum quantizer value (or an approximation to the maximum) for a coefficient to produce an error that meets the error threshold. By identifying the maximum quantizers that produce compression errors that meet the assigned error thresholds, the image processing system provides customized compression for the image to allow for high compression without losing important data.

Despite the foregoing, it is possible that there could be a small region of an image that could have a lot of high frequency components (e.g., small text in an image) but is assigned to a low priority bucket due to the size of the image. Optionally, the image processing system identifies any outlier coefficients from the content of the image to identify such regions. In particular, the image processing system analyzes one or more low priority buckets to determine whether any of the coefficients in the low priority buckets include an outlier. For example, the image processing system determines whether frequency information in a bucket is above a threshold value for the next bucket with a higher priority. If a certain percentage of coefficients for a location in a frequency matrix of image content are above the threshold value, the image processing system promotes the coefficient to the next bucket to prevent or reduce artifacts in that region of the image.

As described herein, the image processing system provides advantages over conventional image processing systems by generating a custom quantization table based on the content of the image. Specifically, by maximizing the quantizers in the quantization table based on error thresholds determined by image content, the image processing system provides consistent image compression within any given image and across a plurality of different images containing different content. For example, the custom quantization table allows the image processing system to provide a high compression in areas of an image that can include compression errors without noticeably affecting the visual quality and at the same time provide lower compression in areas of the image in which compression errors would be more noticeable.

Additionally, the image processing system provides improved compression of large numbers of separate images. In particular, the image processing system allows for the automation of batch processing while also providing the benefits of customized quantization tables. For example, the image processing system allows for the selection of a quality setting to apply to a plurality of images. To illustrate, a user can select a quality for compressing images. Based on the selected quality, the image processing system automatically compresses the images to achieve a certain visual fidelity by generating a plurality of customized quantization tables and compressing the images using the customized quantization tables. Thus, the image processing system provides an ability to compress a plurality of images at the same quality despite the differences in content of the images.

Figure 1B:
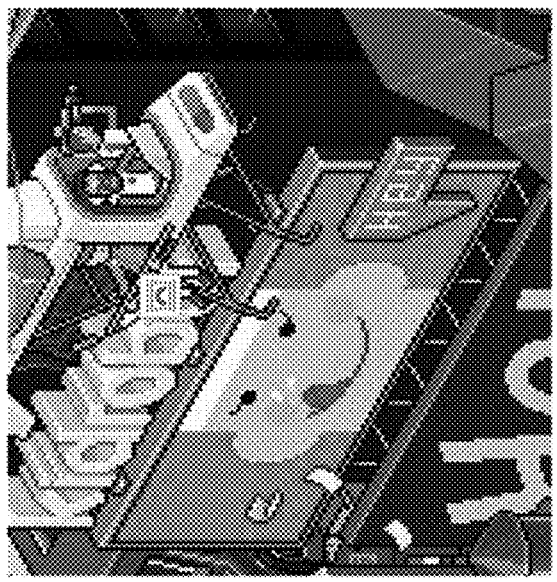

Referring now to the figures, FIGS. 1A-1B and 2A-2B illustrate a plurality of source images and compressed images using conventional JPEG compression methods. Specifically, FIG. 1A illustrates a first source image 100, while FIG. 1B illustrates a first compressed image 102 (i.e., compressed version of the first source image 100). More specifically, the first compressed image 102 is the first source image 100 compressed at a first quality setting (quality 85) that uses a predefined quantization table.

As used herein, the term "quantization table" refers to a matrix of quantizers that allow an image processing system to compress, or reduce, a file size of an image. For example, a quantization table includes a plurality of numerical values that the image processing system uses to reduce the value of a plurality of coefficients that define the image content. To illustrate, a quantization table for an 8×8 block of frequency domain coefficients (e.g., numerical values representing magnitudes associated with transform basis functions) is a matrix of 8×8 quantizers that indicate by what values to reduce the values of the coefficients. A predefined quantization table includes fixed quantizers for applying to a plurality of images based on a selected image quality setting.

Figure 2B:
FIGS. 2A-2B illustrate a second source image and a version of the secondsource image compressed using conventional JPEG compression methods.
Figure 2A:

FIG. 2A illustrates a second source image 200 and a second compressed image 202 (i.e., a compressed version of the second source image 200). In particular, the second compressed image 202 is the second source image 200 compressed at a second quality setting (quality 75) that uses a predefined quantization table. Because the first quality setting is intended to produce a different compression quality/amount than the second quality setting, the conventional image compressing system uses different predefined quantization tables to compress each of the first source image 100 and the second source image 200.

As illustrated, the second compressed image 202 does not lose as much visual fidelity as the first compressed image 102, even though the second quality setting has a lower quality than the first quality setting. In particular, although the first compressed image 102 is compressed at quality 85 and the second compressed image 202 is compressed at quality 75, the first compressed image 102 includes clearly visible artifacts while the second compressed image 202 does not. The introduction of visible artifacts even at relatively high quality settings is often due to the reliance on high frequency DCT components for proper visual construction of the original image (e.g., in edges with many sharp edges/transitions). Thus, because the first source image 100 (a synthetic image with many sharp edges) relies on high frequency information and the second source image 200 (a natural image with few sharp edges) does not, data loss is more noticeable in the first compressed image 102 than in the second compressed image 202 due to the predefined quantization tables zeroing out high frequency information.

As quantization is the primary lossy step in JPEG compression, customizing the quantization table for each image allows the image processing system to determine whether to highly compress the high frequency coefficients by tolerating more error or even zeroing them out completely based on the content of the image. Specifically, the image processing system determines whether to trade file size for visual fidelity by retaining high frequency information in accordance with the content of the image or user input. To illustrate, the image processing system can identify an image that relies on high frequency information (e.g., a synthetic image or vector image with many sharp edges) and retain the high frequency information when compressing the image. Alternatively, the image processing system can determine that the high frequency information is not as important for a particular image based on the content of the image and highly compress the high-frequency information for a smaller file size. For example, the image processing system identifies an image that does not rely on high frequency information (e.g., a natural image with few sharp edges) and highly compresses the high frequency information when compressing the image.

Figure 3:
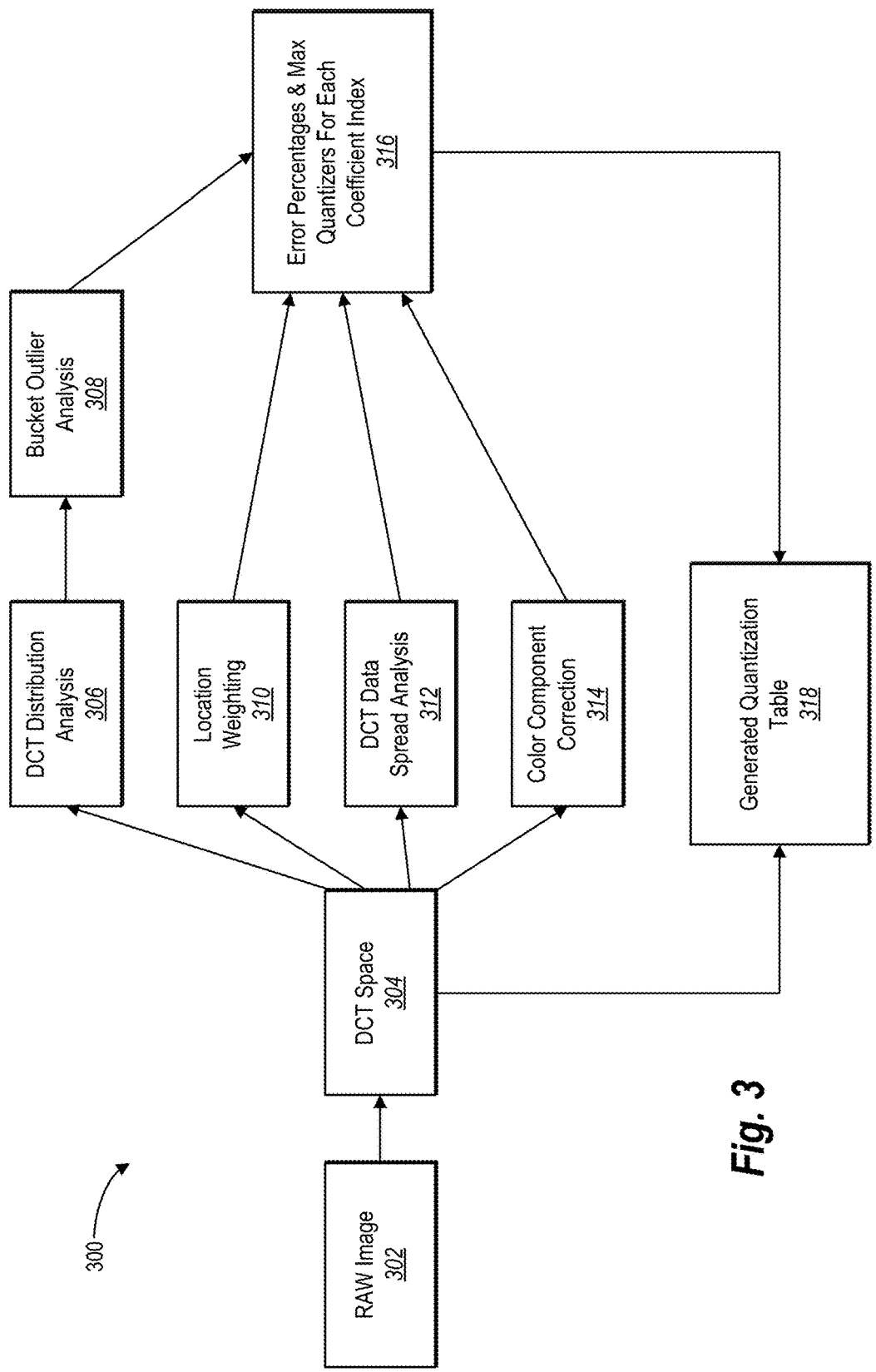
FIG. 3 illustrates a flow diagram of a quantization table generation process in accordance with one or more embodiments.

An overview of the process of generating a custom quantization table will now be provided with reference to FIG. 3. Thereafter, a more detailed description of the various steps of of FIG. 3 are will be provided with reference to FIGS. 4-6. FIG. 3 illustrates a flow diagram of a method 300 utilized by the image processing system to generate custom quantization tables in accordance with one or more embodiments. For example, the image processing system generates at least one custom quantization table to apply to a source image 302 (e.g., a RAW image file) for compressing the source image 302. As previously described, the image processing system can compress a plurality of images by generating a custom quantization table for each color space component of an image based on a quality setting. For example, a user or a workflow selection can indicate a purpose of the image (e.g., web use; photo editing; or other low, medium, or high quality applications) based upon which the image processing system determines how much compression error is acceptable. As used herein, the term "compression error" refers to an error resulting from compressing an image with a lossy compression format. Specifically, compression error in JPEG compression includes errors due to losing information from quantizing content data in an image.

As shown by FIG. 3, the image processing system converts 304 an image to a DCT space. Specifically, the image processing system converts a plurality of blocks of the image from the spatial domain to the frequency domain by applying a DCT to the plurality of blocks. For example, the image processing system converts each block of the image to a block that includes frequency information, resulting in a plurality of DCT matrices that include frequency information (i.e., a plurality of coefficients) for the image. Converting the image blocks to the frequency domain allows the image processing system to identify various characteristics of the content of the image that affect the visual fidelity of the image during compression, as described briefly in relation to FIG. 3 and in more detail further below.

In one or more embodiments, the image processing system uses the frequency domain information to identify the contribution of the coefficients to the image. In particular, the image processing system analyzes 306 the frequency distribution for the image based on the coefficients for the plurality of DCT matrices. For example, the image processing system determines whether each coefficient location across the plurality of blocks has primarily high values or primarily low values based on averaged coefficient values for the plurality of blocks. As used herein, the term "location" refers to a specific cell at a specific row and column position. For example, a location can refer to coefficients at row i and column j of a plurality of DCT matrices in an image. In at least one implementation, the image processing system averages the coefficients from the plurality of DCT matrices to create an averaged block, or an averaged DCT matrix. Averaged coefficients with high values indicate that the corresponding DCT basis functions have a high contribution to the visual structure of the image. Introducing high error percentages into a DCT basis function that has a high contribution to the visual structure of the image can cause heavy visual artifacting. Thus, the image processing system places the coefficients into different buckets to prioritize coefficients that have a large effect on the visual fidelity of the image and provide low priority to coefficients that have minimal impact on the visual fidelity of the image. As used herein, the term "bucket" refers to a categorization or grouping of coefficients. In particular, a bucket can include coefficients that have a characteristic as determined by the image processing system. For example, a bucket can include coefficients that have a certain statistical characteristic (e.g., a mean and standard deviation) within a certain range of values.

In one or more embodiments, the image processing system prioritizes the coefficients by weighting 310 a location of each coefficient. In particular, the image processing system weights the locations based on whether the location corresponds to a high frequency coefficient or a low frequency coefficient. For example, coefficients in the upper left area of the DCT matrices have low frequencies and are typically most important to the visual fidelity of an image, and can thus have a higher weight. The coefficients in the lower right area of the DCT matrices have high frequencies and typically are not as important to the visual fidelity of the image, and can thus have a lower weight. As described in more detail below, the image processing system weights the locations of the DCT matrices based on empirical data and also on the selected workflow for compressing the image.

According to one or more embodiments, the image processing system also analyzes 312 of the spread of the coefficients in the DCT matrices. For example, the image processing system determines how spread out the frequency information is for the image. To illustrate, the image processing system determines whether the content is more heavily concentrated in a particular area of the DCT matrices or more evenly spread across a plurality of coefficients in the DCT matrices. Depending on the spread of the image information, the image processing system chooses evenly spread quantization or heavy quantization in specific areas of the DCT matrices to reduce the image size and also preserve important image details.

Additionally, one or more embodiments of the image processing system perform 314 color space component correction to further optimize the compression of the image. For example, certain color space components have more of an impact on the image detail than other color space components in accordance with the human visual system. To illustrate, human eyes are more sensitive to variations in brightness than in chrominance. Thus, the image processing system can compress certain color space components more than other color space components while retaining visual fidelity.

As illustrated in FIG. 3, the image processing system uses a plurality of parameters from the above processes to generate a quantization table. Specifically, the image processing system first calculates 316 error percentages (i.e., error thresholds) and maximum quantizers for the coefficients. Based on the error percentages and maximum quantizers, as well as based on the DCT space data, the image processing system determines the quantizers that make up the custom quantization table. More specifically, the image processing system generates 318 a custom quantization table for each color space component in the color space for the image and uses the custom quantization table(s) to compress the image.

Figure 4:
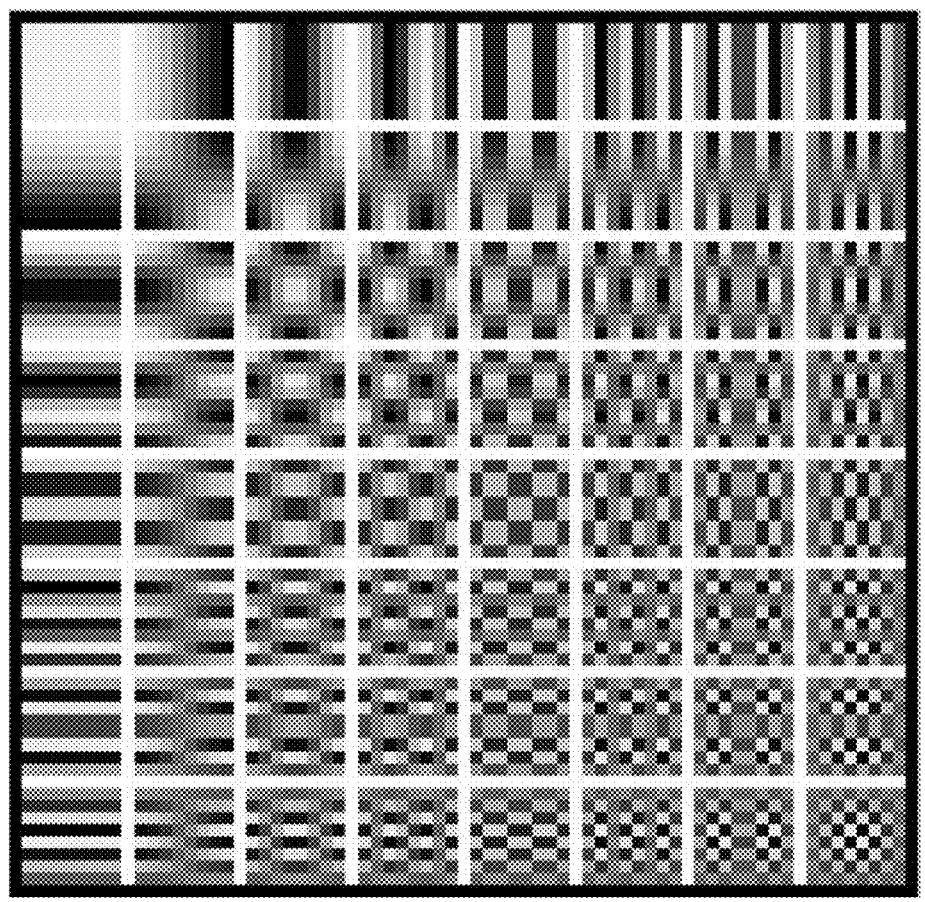
FIG. 4 illustrates an image of discrete cosine transform basis functions in accordance with one or more embodiments.
Figure 6:
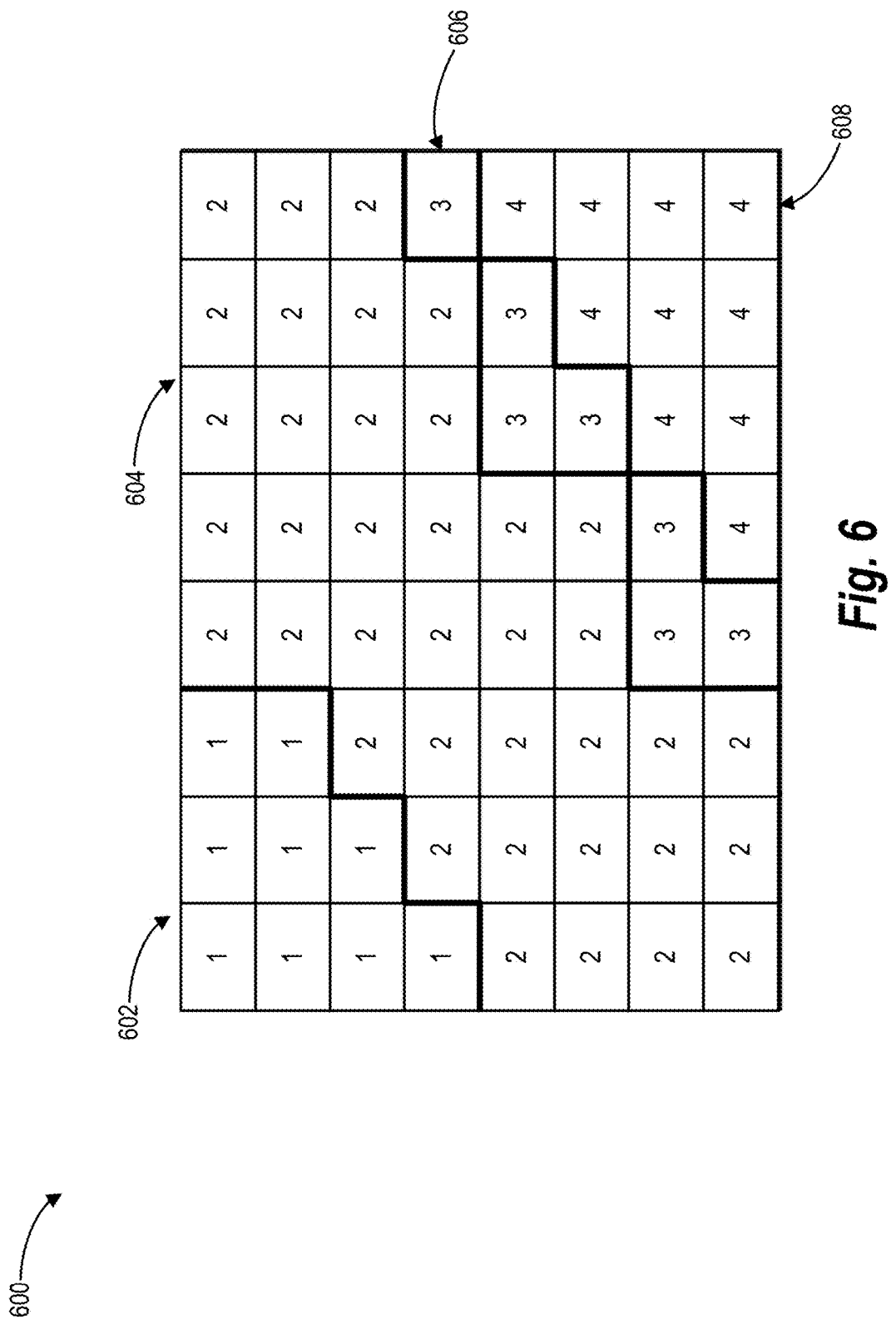
FIG. 6 illustrates a graph diagram of a matrix including a plurality of weighted locations in accordance with one or more embodiments.

FIGS. 4-6 and the accompanying description provide additional detail about the method of generating custom quantization tables of FIG. 3. As mentioned previously, the image processing system uses the JPEG compression standard to compress digital images. The image processing system optimizes the JPEG compression standard for each image by generating custom quantization tables that allow for consistent visual fidelity when compressing images in accordance with a selected workflow.

In general, JPEG compression includes breaking an image up into blocks (e.g., 8×8 pixel blocks). Optionally, after the image processing system splits the image into a plurality of blocks, the image processing system verifies that the color space associated with the image is the Y'CbCr color space. Specifically, the Y'CbCr color space includes a luma component (i.e., "Y'"), and two chroma components—the blue-difference (i.e., "Cb") and red difference (i.e., "CR") chroma components. Although the image processing system can use the Y'CbCr color space, the image processing system can use other color spaces when compressing images, such as the RGB color space.

After verifying that the color space is a specific color space, the image processing system then converts the blocks from the spatial domain to the frequency domain by applying a DCT to each individual block in the image. Each 8×8 block in the image is converted to an 8×8 block that includes 64 frequency coefficients representing the image content by frequency. Specifically, the 64 frequency coefficients control the magnitude of corresponding DCT basis functions. FIG. 4 illustrates an image 400 of the 64 DCT basis functions that the image processing system uses to convert frequency content back out of the frequency domain during JPEG compression. For example, the image processing system reconstructs an image from the frequency domain information using linear combinations of the DCT basis functions as determined by the magnitudes of the coefficients.

To compress an image with JPEG compression, the image processing system uses quantization to modify the size of the image. Specifically, the image processing system uses, for an image, a single quantization table that includes 64 parameters (i.e., coefficient quantizers) for use with 8×8 blocks that compress aspects of the image. The quantizers allow the image processing system to divide each coefficient in the frequency domain by a corresponding number (i.e., integer) and store the output values. The output values from quantization take up a smaller amount of storage space than the original coefficient values by reducing the range of possible values to be encoded in entropy coding. Additionally, JPEG compression uses run-length encoding, which can indicate an oncoming number of zeros using a single symbol, rather than a separate symbol for each zero.

Decoding the encoded values to reconstruct the image involves multiplying the output values by the respective quantizers to obtain the original values (or approximately the original values). Because JPEG compression uses integer division, however, the output values of quantization are integers and result in the potential loss of image data if the division for a coefficient includes a remainder. Furthermore, while higher quantizer values produce greater compression and lower file size, higher quantizer values often produce larger remainders and result in more data loss.

As previously described, the image processing system generates at least one custom quantization table (e.g., one for each color space component) for compressing an image. The custom quantization table includes a plurality of quantizers that encode the DCT matrices by reducing the values of the coefficients in the averaged matrix during compression. Reducing the size of the coefficient values using the corresponding quantizers also reduces the overall size of the image due to the smaller integer values of the compressed coefficients.

In one or more embodiments, the image processing system generates the custom quantization matrix based on a maximum amount of error introduced into the compressed image. For example, the quantization matrix introduces an approximation error into the image when reconstructing the image based on the compressed coefficients. In particular, the approximation error (or error percentage when reconstructing the image is as follows:

$$E = \frac{\left|X - \left(\left\lfloor \frac{X}{Q} \right\rfloor * Q\right)\right|}{X} * 100$$

where E is the error percentage in one pass, X is the coefficient value, and Q is the quantizer value.

To illustrate, for a coefficient of 48, quantizing with the value 7 results in a stored integer value of 6. When reconstructing the image, the stored value of 6 becomes 42, resulting in an error percentage of 6/48=12.5% for that coefficient. To illustrate the effect of the quantizer on coefficients, applying a quantizer of 7 to a plurality of different possible coefficient values ranging from 42 to 49 produces a plurality of different error percentage values, as in the table below.

| | Coefficient Value | | | | | | |
|---|---|---|---|---|---|---|---|
| 42 | 43 | 44 | 45 | 46 | 47 | 48 | 49 |
| Error % 0% | 2.32% | 4.5% | 6.66% | 8.69% | 10.63% | 12.5% | 0% |

As illustrated, the same quantizer value produces different error percentages for different coefficient values. As one can appreciate, larger quantizer values can produce larger error percentages than smaller quantizer values. As the error percentage increase, the artifacts in an output image based on reconstructing the compressed image become more visible.

The image processing system overcomes disadvantages of predefined quantization tables by generating custom quantization tables for compressing images. Specifically, using the same predefined quantization tables for a plurality of different images yield different amounts of mathematical error, which results in different amounts of visual error. Thus, a plurality of images compressed with the same quantization table can have varying visual fidelity as compared to the respective source images, as illustrated in FIGS. 1A-1B and 2A-2B. Additionally, predefined quantization tables can produce significantly different error percentages for different coefficients within the same image based on the reliance on different coefficients for reconstructing detail of the image. The custom quantization tables take into account all of the coefficients in the frequency domain to determine how to quantize each individual coefficient.

As previously mentioned, a user can select a quality setting for compressing images using the image processing system. For example, the user can select a quality setting associated with an intended use, such as a quality setting for creating thumbnail versions of larger images or a quality setting for editing high-resolution images with a photo editing application. The image processing system determines how much error to introduce into an image based on the selected quality setting by establishing a plurality of error thresholds for a quantization table. Because the visual fidelity is based on the selected quality setting, a user can tune the workflow to modify the visual fidelity and/or compression amount.

In one or more embodiments, the image processing system determines the error thresholds by first analyzing frequency domain coefficients (e.g., the coefficients of a plurality of DCT matrices) to determine the contribution of each coefficient to the visual structure of the image. Specifically, the image processing system calculates the mean and standard deviation values of each coefficient across the plurality of DCT matrices for the image. For example, the image processing system generates an averaged 8×8 block for the image using the mean values of the corresponding coefficients.

FIG. 5 illustrates an embodiment of an averaged block 500 for a plurality of DCT matrices of an image. In particular, the averaged block 500 is an 8×8 block that includes a plurality of averaged coefficients for a plurality of different locations in the plurality of DCT matrices for a luma color space component (e.g., the Y' color space component in the Y'CbCr color space). Each location in the averaged block 500 corresponds to a specific set of frequency information in the content of the image. To illustrate, the averaged coefficients toward an upper left area of the averaged block 500 include low frequency information, while the averaged coefficients in the lower right area of the averaged block 500 include high frequency information.

After identifying the mean and standard deviation values, the image processing system generates a plurality of buckets, or coefficient groups, for determining an importance of the coefficients to the visual structure of the image. The buckets drive the error percentage that is acceptable for each coefficient within the respective bucket. Specifically, the image processing system creates a threshold vector (e.g., <T1, T2, T3, T4> for an embodiment including four buckets) for assigning coefficients to the buckets. The actual values of the thresholds in the threshold vector are based on an overarching desired quality. The thresholds represent a range of threshold values given by the expression (mean[i]+ 2*standardDeviation[i]) for each bucket, where i represents the coefficient.

Based on the derived thresholds, the image processing system places each coefficient into one of the buckets. In one or more embodiments, the image processing system populates the buckets starting with high priority coefficients and ending with low priority coefficients. For example, the image processing system populates the buckets by starting with the high frequency coefficients in the upper left area of the averaged block and continuing toward the low frequency coefficients in the lower right area of the averaged block until all of the coefficients are place in a bucket.

Additionally, one or more embodiments of the image processing system identify outlier coefficients that are not identifiable from the coefficients in the averaged block. In particular, mean and standard deviation are statistically prone to a failure to detect outliers, such as portions that include important detail in high frequency information of the image (e.g., small text in the image). Because images typically contain many 8×8 blocks, each having a corresponding DCT block, outliers may not be reflected in the mean coefficient values. Thus, the image processing system performs additional analysis of the individual DCT matrices to ensure that the system does not lose detail when compressing the image.

In one or more embodiments, the image processing system searches for outliers by examining the coefficients in one or more buckets. For example, the image processing system analyzes the coefficients in one or more low priority buckets to identify the outliers. To illustrate, the image processing system determines whether a common location in the DCT matrices includes a predetermined percentage of values (e.g., 0.5% or other percentage as may be determined by the workflow) meets the threshold for the next bucket. If the predetermined percentage of values meets the threshold for the next bucket, the image processing system promotes the coefficients at that location to the next bucket. Promoting coefficients from a low priority bucket to a higher priority bucket can prevent or reduce the image processing system from losing information that is important in constructing the image, thereby preventing clearly visible artifacting.

After separating coefficients into buckets and checking for outliers, the image processing system leverages the human visual model independently from the image to assign priority to the different locations of coefficients in the averaged block. In particular, the image processing system uses the knowledge that the human eye tends to detect low frequency changes/transitions much more easily than high frequency changes/transitions to determine the priority of the different locations. Each priority also has a corresponding weight that the image processing system applies to coefficients that are given the priority.

The image processing system separates the locations into a plurality of different importance levels. For example, the image processing system can determine the different importance levels based on the number of buckets. To illustrate, if the image processing system uses four buckets, the image processing system separates the coefficients into four importance levels. Alternatively, the image processing system can use a different number of importance levels than buckets and apply the weights to the locations independently of the assignment of coefficients to the different buckets.

FIG. 6 illustrates a location importance map 600 that has four different importance levels for a luma color space component, each with a different weight for the respective locations. As shown, the location importance map 600 correlates to a DCT matrix—i.e., the map 600 includes 64 locations for the plurality of coefficients in a DCT matrix. The four different importance levels are each represented in FIG. 6 by a plurality of locations in the map that have a common number. To illustrate, a first importance level is indicated by a first group 602 of locations with the number "1", a second importance level is indicated by a second group 604 of locations with the number "2", a third importance level is indicated by a third group 606 of locations with the number "3", and a fourth importance level is indicated by a fourth group 608 of locations with the number "4", with the first importance level being the most important and the fourth importance level being the least important.

The image processing system assigns different weights to locations based on the different importance levels. For example, the image processing system assigns a higher weight to locations having the first importance level than locations having a lower importance level. Similarly, the image processing system assigns a lower weight to locations having the fourth importance level than locations having a higher importance level. For instance, the image processing system applies the weights when determining a plurality of compression error thresholds to associate with the plurality of buckets. Alternatively, the image processing system applies the weights when quantizing coefficients or otherwise processing image content information associated with the different locations.

In one or more embodiments, the image processing system generates the location importance map 600 based on various criteria. Specifically, the image processing system can generate the location importance map 600 based on properties of the human visual system, a selected quality setting, and/or the type of encoding used in compressing images (e.g., run length encoding). To illustrate, for a thumbnail quality setting, very high frequency information may not be as important as for a photo editing workflow. The image processing system can use the DCT basis functions to determine which locations are important for a given quality setting.

Additionally, the image processing system can generate a different map for one or more different color space components in the color space. In particular, the image processing system processes the coefficients for each color space separately, so generating separate location importance maps can be useful in achieving optimal results for one or more of the different color space components. For example, the image processing system can generate a first location importance map for the luma component and a second location importance map for both of the chrominance components. Alternatively, the image processing system can generate different location importance maps for each of the chrominance components.

The image processing system then analyzes the spread of information in the DCT space when analyzing the 8×8 averaged block for the image. Specifically, the image processing system determines how much information is located in each frequency group (e.g., high frequency information, low frequency information, or in between) to determine whether the image relies on low frequency information, high frequency information, and/or spread out generally evenly across the frequencies for the visual structure of the image. If the image does not rely on high frequency information (i.e., the information is aggregated in the upper left), the image processing system can use quantizers that will zero out the high frequency information or heavily quantize the coefficients in those locations. Alternatively, if the image relies on a lot of high frequency information or an even spread of information across all coefficients, the image processing system can choose lower quantizers to minimize the spread of error throughout the image structure.

According to one or more embodiments, the image processing system spreads the acceptable amount of error introduced into an image across the plurality of coefficients in the averaged block. Although the location importance map provides empirical data in determining the acceptable error percentages, identifying the information spread allows the image processing system to use the content of the image itself in assigning the error percentages. A coefficient at a low priority location, as determined by the location importance map, could in actuality contribute significantly to the image structure in tandem with other coefficients. The image processing system can accordingly give importance to such a coefficient based on the image.

As previously illustrated, the averaged block 500 of FIG. 5 includes averaged coefficients for the luma component of an image. As shown, the averaged block 500 has a spread of information across all of the coefficients, including the high frequency locations associated with the lower right coefficients, indicating that the image relies on many different frequencies. Performing the analysis of the information spread allows the image processing system to determine that all of the coefficients are important to the image structure, rather than relying solely on the location importance map 600 of FIG. 6, which would result in significant loss of detail due to high error percentages in the high frequency locations. Additionally, high errors in all, or most, of the coefficients can visibly distort the image in a plurality of ways.

In one or more embodiments, when the image processing system determines that the information spread is over many different coefficients, the image processing system adjusts for the wide information spread. In one example, the image processing system rearranges the error percentages already assigned to locations to reduce the error percentage for one or more coefficients and provide more consistent error percentages. Alternatively, the image processing system caps the highest quantizer that can be chosen for a given coefficient. To illustrate, the image processing system can determine that the given coefficient can have a maximum quantizer of a certain value so as to limit the error percentage for that coefficient and introduce minimal complexity into the image processing system.

After determining the error percentage for each coefficient, the image processing system processes the color space components differently. In particular, the image processing system can leverage the human visual model to make use of human eyes being more sensitive toward detecting variations in brightness than in chrominance. For example, the image processing system can apply greater compression to chrominance components of an image. To illustrate, the image processing system can use different location importance maps for different color space components. The image processing system can also assign different error percentages to coefficients and/or apply different thresholds for determining how to separate the coefficients into buckets.

Furthermore, once the image processing system has parameters from the analysis and calculations in the DCT space, the image processing system can combine the parameters (e.g., the parameters from each step in FIG. 3) into a single algorithm that produces an error percentage matrix, with an error percentage entry for each corresponding coefficient location. In one or more embodiments, after the image percentage determines the final error percentages, the system iterates over each coefficient location and chooses the first number as the quantizer. The selected quantizer introduces error that meets the selected threshold for that specific image. The image processing system identifies quantizers for all of the coefficients and then generates a custom quantization table for each of the image's color space components.

According to one or more embodiments, the image processing system determines a quantizer by iterating through a plurality of values until finding the maximum value that fits the criteria determined by the image processing system for that location. The image processing system can create a histogram of the frequency data for the image and isolate the data for the specific location of a given coefficient. Using the histogram, the image processing system can quickly identify the largest quantizer that produces an error that meets the corresponding compression error threshold.

According to a particular implementation, the image processing system stores an image's data in the DCT space using a frequency table. Since a single DCT coefficient's value in the DCT space can be 11 bits large, the image processing system creates a frequency table for all possible DCT coefficient values, noting the frequency of any particular value. This allows the system to store the image data in a very compressed form. Even with a simple frequency table and without any advanced data structures, the image includes $2^{11}$ frequency table values, with 4 bytes for each value's frequency, 64 coefficients and maximum 4 color space components. Thus, the file size becomes $2^{11}*2^2*2^6*2^2=2^{21}$ bytes (or approximately 2 Megabytes).

Additionally, the image processing system includes an encoder that intercepts the DCT and quantization stages, and feeds the DCT data for each block to a quantization generator block. After transforming the image into the DCT space, the quantization generation block evaluates the image and returns the selected quantization tables. The system then applies the selected quantization tables to the image, and the rest of the encoding continues according to JPEG compression standards. Because the processes described herein add linear overhead over normal linear encoding routines, the image processing system is scalable. The system is also parallelizable by processing different regions of the image separately and using multiple accumulators.

In one embodiment, the image processing system implemented the custom quantization algorithm in a JPEG library. The table below includes a comparison of the output using the custom quantization algorithm to an output of compression used in ADOBE® BEHANCE®.

| Selected Quality | Average File Size - Output | Average File Size - BEHANCE | Average Compression | Maximum Compression | Minimum Compression |
|---|---|---|---|---|---|
| Low | 51317 | 103331 | 2.01x | 3.62x | 0.53x |
| Medium | 54705 | 103331 | 1.89x | 3.15x | 0.47x |
| High | 67307 | 103331 | 1.54x | 2.79x | 0.39x |
| Very High | 76709 | 103331 | 1.38x | 2.68x | 0.33x |

At the low/medium qualities, which are often useful for thumbnail workflows, the algorithm provides as much as 2× average compression, while giving visually good looking files. As illustrated, the image processing system allows a user to choose the appropriate quality for compressing images. The maximum compression and minimum compression numbers indicate that the image processing system is dynamic within a selected quality, without requiring a user to specify a quality setting for each separate image. The image processing system intelligently determines where to apply more compression to minimize the amount of visual artifacts and maximize the size reduction of an image. Similarly, the image processing system can also identify where to apply lower compression to preserve the visual fidelity of the image.

Figure 7:
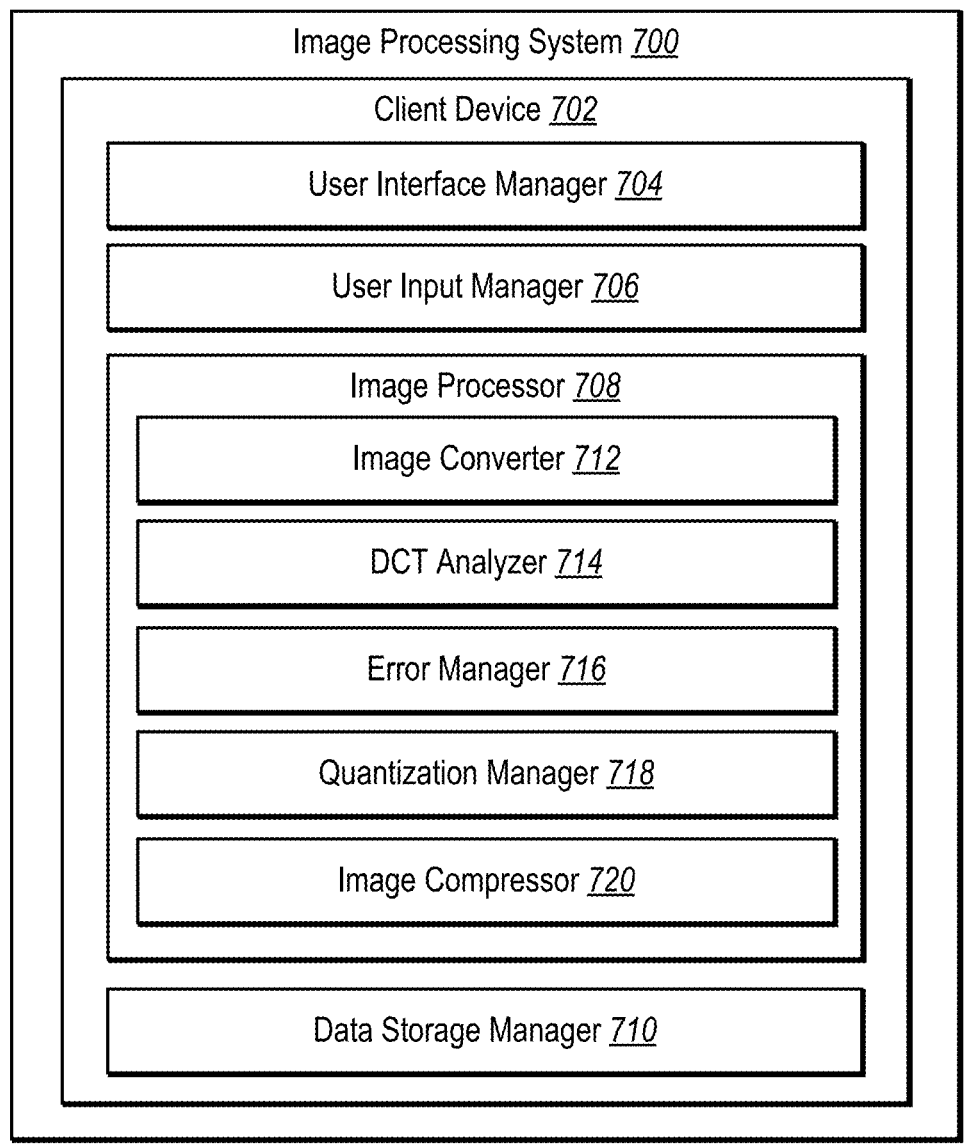
FIG. 7 illustrates a schematic diagram of an image processing system in accordance with one or more embodiments.

As described above, an image processing system can improve image compression using custom quantization tables. FIG. 7 illustrates a schematic diagram of an image processing system 700 implemented by a client device 702. The image processing system 700 can include, but is not limited to, a user interface manager 704, a user input manager 706, an image processor 708, and a data storage manager 710. Although the image processing system 700 of FIG. 7 is depicted as having various components, the image processing system 700 may have any number of additional or alternative components. Additionally, although FIG. 7 illustrates the image processing system 700 being implemented by the client device 702, the image processing system 700, one or more of the illustrated components, can be implemented on a plurality of client devices or server devices communicating over a network.

In one or more embodiments, each of the components of the client device 702 are in communication with one another using any suitable communication technologies. Although the components of the image processing system 700 are shown to be separate in FIG. 7, any of the components may be combined into fewer components, such as into a single component, or divided into more components as may serve a particular implementation. Furthermore, although the components of FIG. 7 are described in connection with the image processing system 700, at least some of the components for performing operations in conjunction with the image processing system 700 described herein may be implemented on other devices and/or with other systems, such as a cloud-based storage system for storing large numbers of images.

The components of the image processing system 700 can include software, hardware, or both. For example, the components of the image processing system 700 (e.g., the user interface manager 704, the user input manager 706, the image processor 708, and the data storage manager 710) can include on or more instructions stored on a computer-readable storage medium and executed by processors of one or more computing devices such as the client device 702. When executed by the one or more processors, the computer-executable instructions of the image processing system 700 can cause the computing devices to perform the image compression processes described herein. Alternatively, the components of the image processing system 700 can comprise hardware, such as a special purpose processing device to perform specific functions associated with image compression processes. Additionally, the components of the image processing system 700 can comprise a combination of computer-executable instructions and hardware.

Furthermore, the components of the image processing system 700 performing the functions described herein with respect to the image processing system 700 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the image processing system 700 may be implemented as part of a stand-alone application on a personal computing device or a mobile device. Alternatively, the components of the image processing system 700 may be implemented in any application that allows delivery of content to users, including, but not limited to, applications in ADOBE® CREATIVE CLOUD®, ADOBE® PHOTOSHOP®, and ADOBE® BEHANCE® as previously mentioned. "ADOBE", "CREATIVE CLOUD", "PHOTOSHOP" AND "BEHANCE" are registered trademarks of Adobe Systems Incorporated in the United States and/or other countries.

As mentioned, the image processing system 700 of FIG. 7 includes a user interface manager 704 to facilitate the management of user interfaces for display on a display device associated with the client device 702. For example, the user interface manager 704 manages user interfaces associated with one or more image applications. To illustrate, the user interface manager 704 can manage the user interfaces associated with image editing applications, cloud-based storage applications, and/or other applications that allow one or more users to access, view, and modify images according to the principles described herein.

The image processing system 700 also includes a user input manager 706 that allows users to provide input to the client device 702. For example, the user input manager 706 allows users to select one or more images to compress. Additionally, the user input manager 706 allows users to select a workflow for applying specific compression qualities to one or more images. To illustrate, a user can select a workflow associated with an expected quality or an intended purpose.

The image processor 708 processes images by compressing the images according to the custom quantization algorithm described herein. In one or more embodiments, the image processor 708 includes an image converter 712, a DCT analyzer 714, an error manager 716, a quantization manager 718, and an image compressor 720. The image processor 708 can include additional components or fewer components (e.g., by combining one or more of the components) as may serve a particular embodiment. The image processor 708 can include or communicate with a graphics processing unit and/or another processor to perform image processing operations associated with compressing images.

In one or more embodiments, the image converter 712 performs one or more operations associated with separating the image into a plurality of blocks and converting the blocks from a spatial domain to a frequency domain. For example, the image converter 712 can divide the image into a plurality of 8×8 blocks and then convert the blocks into the frequency domain using DCTs. The image converter 712 converts each color space component (e.g., luma, chrominance) to the frequency domain. Additionally, the image converter 712 can facilitate the conversion of frequency domain information to the spatial domain when reconstructing encoded/compressed image data.

According to one or more embodiments, the DCT analyzer 714 facilitates the analysis of frequency domain information associated with images. Specifically, the DCT analyzer 714 facilitates the analysis of frequency distribution and outliers (e.g., placing coefficients into different buckets), location weighting, DCT data spread, and color space component correction, as described in relation to FIG. 3. The DCT analyzer 714 obtains one or more parameters for use in obtaining error percentages, and subsequently, the quantizers for each quantization table.

The error manager 716 facilitates the determination of acceptable error during a compression process of an image. In particular, the error manager 716 determines error thresholds for a plurality of buckets. For example, the error manager 716 determines the error thresholds for the plurality of buckets to allow the image processing system 700 to provide consistent compression quality throughout an entire image. The error manager 716 can assign an error threshold based on a selected workflow and the content of the image.

The quantization manager 718 facilitates the generation of custom quantization tables for images. Specifically, the quantization manager 718 generates a custom quantization table for one or more color space components of an image using quantizers that are based on the error thresholds. For example, the quantization manager 718 determines a plurality of quantizers for a plurality of locations in an averaged DCT block of a color space component by identifying the quantizer values that will produce compression errors that meet the error thresholds.

The image compressor 720 facilitates the compression of images using parameters obtained by the other components of the image processor 708. For example, the image compressor 720 applies JPEG compression using the custom quantization tables that the quantization manager 718 generated for an image based on a selected workflow. To illustrate, the image compressor 720 can facilitate the compression of an image based on a workflow that results in a specific visual fidelity of the image in accordance with the custom quantization tables.

The image processing system 700 also includes a data manager 710 to manage data that the other components in the image processing system 700 use and/or produce. Specifically, the data manager 710 can communicate with the other components in the image processing system 700 (i.e., the user interface manager 704, the user input manager 706, and the image processor 708) to obtain data that the components have produced for storage and/or use by one or more of the components. To illustrate, the data manager 710 can store data that includes, but is not limited to, spatial image blocks of an image, DCT frequency data, error thresholds, quantization tables, image compression data, and/or other information associated with the operation of the image processing system 700.

FIGS. 1A-7, the corresponding text, and the examples, provide a number of different systems and devices for compressing images. In addition to the foregoing, embodiments can be described in terms of flowcharts comprising acts and steps in a method for accomplishing a particular result. For example, FIGS. 8 and 9 illustrate flowcharts of exemplary methods in accordance with one or more embodiments.

Figure 8:
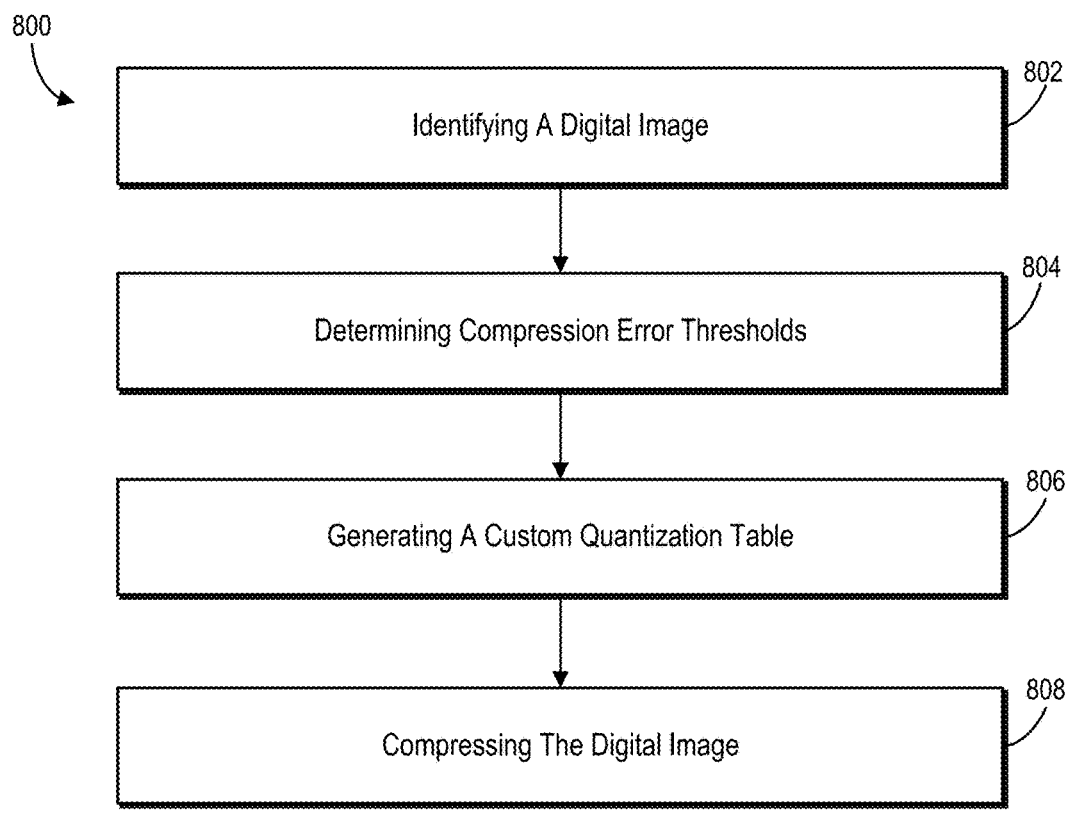
FIG. 8 illustrates a flowchart of a series of acts in a method of compressing digital images in accordance with one or more embodiments.
Figure 9:
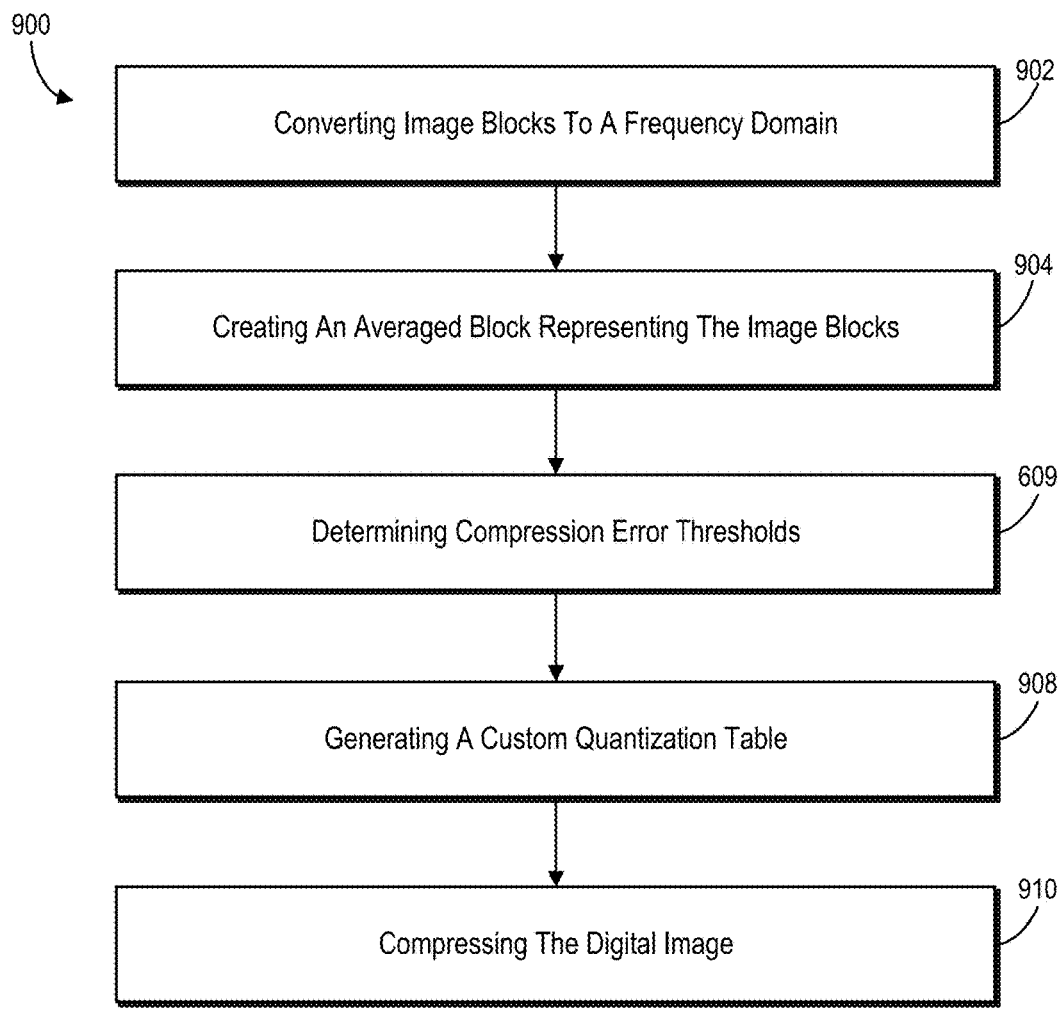
FIG. 9 illustrates a flowchart of a series of acts in another method of compressing digital images in accordance with one or more embodiments.

FIG. 8 illustrates a flowchart in a series of acts in a method 800 of compressing digital images. The method 800 includes an act 802 of identifying a digital image. For example, act 802 can involve identifying a digital image from a user selection. Act 802 can involve identifying a digital image from a plurality of digital images to be compressed. Additionally, the digital image can include an uncompressed image.

As part of act 802, or as an additional act, the method 800 can include segmenting the digital image into a plurality of blocks. For example, the method 800 can involve segmenting the digital image into a plurality of 8×8 pixel blocks. Additionally, the method 800 can include converting the plurality of blocks from a spatial domain to a frequency domain using a discrete cosine transform.

As part of act 802, or as an additional act, the method 800 can include providing a plurality of compression workflows, each compression workflow from the plurality of compression workflows comprising an image quality setting, identifying a selection of a compression workflow from the plurality of compression workflows, and determining the plurality of compression error thresholds based on the image quality setting of the selected compression workflow. To illustrate, a compression workflow can include a workflow associated with a specific application or an intended use of a plurality of compressed images.

The method 800 can include identifying a plurality of frequency domain coefficients associated with the digital image. The method 800 can further include comparing the plurality of frequency domain coefficients to a plurality of thresholds associated with a plurality of buckets, and placing a frequency domain coefficient from the plurality of frequency domain coefficients into a bucket from the plurality of buckets based on the frequency domain coefficient meeting a threshold from the plurality of thresholds associated with the plurality of buckets. The method 800 can include determining the plurality of thresholds associated with the plurality of buckets by calculating thresholds values from a mean and standard deviation of a plurality of frequency domain coefficients for a location in a frequency domain block. The method 800 can also include determining the plurality of thresholds based on a selected workflow.

The method 800 can also include identifying the plurality of frequency domain coefficients by averaging a plurality of coefficients from a plurality of frequency domain blocks across the digital image. The method 800 can also involve separating the averaged plurality of coefficients from the plurality of frequency domain blocks into the plurality of buckets in accordance with the plurality of thresholds associated with the plurality of buckets.

Additionally, the method 800 can include identifying outliers in the plurality of frequency domain coefficients. For example, the method 800 can include identifying a plurality of frequency domain coefficients corresponding to a common location in the plurality of frequency domain blocks. The identified plurality of frequency domain coefficients corresponding to the common location being associated with a first bucket from the plurality of buckets. The method 800 can further include determining whether a predetermined percentage of the identified plurality of frequency domain coefficients corresponding to the common location meets a threshold associated with a second bucket from the plurality of buckets. The method 800 can also involve moving the identified plurality of frequency domain coefficients corresponding to the common location from the first bucket to the second bucket.

The method 800 also includes an act 804 of determining compression error thresholds. For example, act 804 involves determining a plurality of compression error thresholds based on content of the digital image. Act 804 can involve identifying, for a frequency domain coefficient from the plurality of frequency domain coefficients, a compression error threshold from the plurality of compression error thresholds based on the bucket in which the frequency domain coefficient was placed.

The method 800 can also include an act of identifying a plurality of locations in a frequency domain block of the digital image. Method 800 can also involve determining an importance level of each location from the plurality of locations based on the position of the location within the frequency domain block and assigning a weight to each location from the plurality of locations based on the determined importance level. Furthermore, method 800 can include determining a compression error threshold for a frequency domain coefficient based on the assigned weight for the corresponding location of the frequency domain coefficient. For example, the method 800 can include applying a first weight to low frequency data in the frequency domain block and a second weight to high frequency data in the frequency domain block, the first weight being higher than the second weight. Additionally, the method 800 can include generating an importance level map for each color space component from a plurality of color space components of the digital image. The importance level map comprises a plurality of importance levels for the plurality of locations.

The method 800 further includes an act 806 of generating a custom quantization table. For example, act 806 can involve generating a custom quantization table that produces a plurality of compression errors that meet the plurality of compression error thresholds for the digital image. Act 806 can involve selecting a quantizer for the frequency domain coefficient that produces an error that meets the identified compression error threshold. For example, act 806 can involve selecting a quantizer with a highest value that produces an error that meets the identified compression error threshold. Additionally, act 806 can involve identifying a plurality of color space components associated with the digital image, and generating a custom quantization table for each color space component from the plurality of color space components.

As part of act 806, or as an additional act, the method 800 can include determining a coefficient value for each frequency domain coefficient from the plurality of frequency domain coefficients. Furthermore, the method 800 can involve determining, based on the determined coefficient values for the plurality of frequency domain coefficients, an information spread within a frequency domain block that comprises the plurality of frequency domain coefficients. The method 800 can further include establishing, based on the determined information spread, a maximum quantizer value for a frequency domain coefficient value from the plurality of frequency domain coefficients.

Additionally, the method 800 includes an act 808 of compressing the digital image. For example, act 808 involves compressing the digital image using the custom quantization table. Act 808 can involve compressing the digital image according to JPEG compression standards using the custom quantization table. Act 808 can involve compressing each frequency domain coefficient from the plurality of frequency domain coefficients using a corresponding quantizer from the custom quantization table.

Additionally, act 808 can involve compressing the digital image using a plurality of custom quantization tables. For example, act 808 can involve compressing the digital image using a custom quantization table associated with each color space component from a plurality of color space components. Act 808 can also involve compressing a luma color space component less than a chrominance color space component based on a custom quantization table associated with the luma color space component having smaller quantizer values than a custom quantization table associated with the chrominance color space component. Act 808 can also involve encoding the plurality of frequency domain coefficients after applying the custom quantization table to the frequency domain coefficients. For example, act 808 can involve using run-length encoding to encode the plurality of frequency domain coefficients.

FIG. 9 illustrates a flowchart in a series of acts in another method 900 of compressing digital images. The method 900 includes an act 902 of converting image blocks to a frequency domain. For example, act 902 involves converting a plurality of blocks of a digital image to a frequency domain using a discrete cosine transform. Act 902 can involve converting a plurality of 8×8 blocks in a spatial domain to a plurality of 8×8 blocks in a frequency domain. The digital image can include an image from a plurality of images in a cloud-based storage application.

The method 900 includes an act 904 of creating an averaged block 500 representing the image blocks. For example, 904 involves creating an averaged block 500 representing the plurality of blocks in the frequency domain, the averaged block 500 comprising a plurality of coefficients representing content in the digital image. Act 904 can involve calculating a mean and a standard deviation for the plurality of coefficients at each location in a plurality of frequency domain blocks for the digital image.

The method 900 also includes an act 906 of determining compression error thresholds. For example, act 906 involves determining a plurality of compression error thresholds for the plurality of coefficients of the averaged block 500 based on a location of each coefficient within the averaged block 500 and a distribution of the plurality of coefficients within the averaged block 500. Act 906 can involve identifying a contribution of a plurality of frequencies corresponding to a plurality of locations in a frequency domain block to a visual structure of the digital image, and determining the plurality of compression error thresholds based on the contribution of the plurality of frequencies.

As part of act 906, or as an additional act, the method 900 can include determining a plurality of thresholds associated with a plurality of buckets. The method 900 can involve placing a coefficient from the plurality of coefficients of the averaged block 500 into a bucket from the plurality of buckets based on the coefficient meeting a threshold associated with the bucket. Furthermore, the method 900 can include associating a compression error threshold from the plurality of compression error thresholds with the coefficient based on the coefficient being placed into the bucket. Additionally, the method 900 can include associating a different compression error threshold from the plurality of compression error thresholds for each bucket from the plurality of buckets.

The method 900 further includes an act 908 of generating a custom quantization table. For example, the act 908 involves generating a custom quantization table associated with the plurality of blocks by assigning a plurality of quantizers to the plurality of coefficients based on the plurality of compression error thresholds. Act 908 can involve identifying, for a coefficient from the plurality of coefficients, a quantizer comprising a highest quantizer value that produces an error percentage less than or equal to an error percentage defined by the associated compression error threshold, and assigning the identified quantizer to the coefficient from the plurality of coefficients in the custom quantization table.

Additionally, the method 900 includes an act 910 of compressing the digital image. For example, act 910 involves compressing the digital image by applying the custom quantization table to the plurality of blocks. Act 910 can involve compressing a coefficient from the plurality of coefficients using a quantizer from the plurality of quantizers, the quantizer from the plurality of quantizers corresponding to a location of the coefficient from the plurality of coefficients in the averaged block 500.

The method 900 can include identifying a plurality of color space components for the digital image, the plurality of color space components comprising a luma component and a chrominance component. Method 900 can then include generating a first custom quantization table for the luma component and a second custom quantization table for the chrominance component. Method 900 then involves compressing the luma component using the first custom quantization table and the chrominance component using the second custom quantization table. For example, the plurality of color space components can correspond to a Y'CbCr color space. Additionally, the method 900 can include generating the second custom quantization table to include greater quantization values than the first custom quantization value for applying a greater compression amount to the chrominance component than the luma component.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), such as a web service, Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
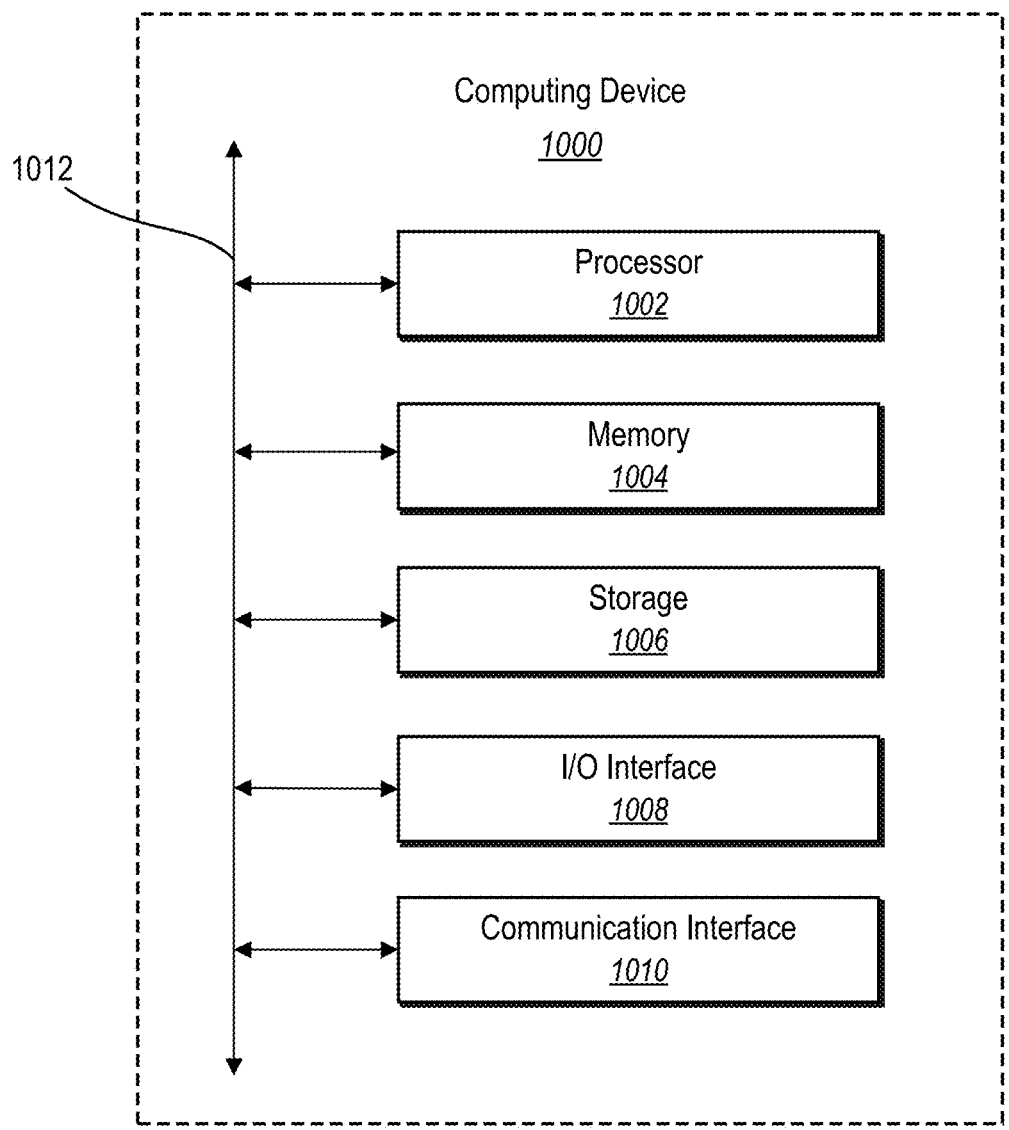
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the image processing system 700. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 7. Components of the computing device 1000 shown in FIG. 7 will now be described in additional detail.

In one or more embodiments, the processor 1002 includes hardware for executing instructions, such as those making up a computer program. As an example and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for compressing digital images, a method comprising:
    identifying, by at least one processor, a digital image;
    converting, by the at least one processor, a plurality of blocks of the digital image to a frequency domain;
    creating, by the at least one processor, an averaged block representing the plurality of blocks of the digital image in the frequency domain, the averaged block comprising a plurality of coefficients representing content in the digital image;
    determining, by the at least one processor, a plurality of compression error thresholds for the plurality of coefficients of the averaged block based on a location of each coefficient within the averaged block and a distribution of the plurality of coefficients within the averaged block;
    generating, by the at least one processor, a custom quantization table that produces a plurality of compression errors that meet the plurality of compression error thresholds for the digital image by assigning a plurality of quantizers to the plurality of coefficients based on the plurality of compression error thresholds; and
    compressing, by the at least one processor, the digital image using the custom quantization table for the plurality of blocks.

2. The method as recited in claim 1, further comprising:
    comparing the plurality of coefficients of the averaged block to a plurality of thresholds associated with a plurality of buckets; and
    placing a coefficient from the plurality of coefficients into a bucket from the plurality of buckets based on the coefficient meeting a threshold from the plurality of thresholds associated with the plurality of buckets.

3. The method as recited in claim 2, further comprising:
    identifying, for the coefficient from the plurality of coefficients, a compression error threshold from the plurality of compression error thresholds based on the bucket in which the coefficient was placed;
    selecting a quantizer for the coefficient that produces an error that meets the identified compression error threshold; and
    assigning the selected quantizer to a location corresponding to the coefficient in the custom quantization table.

4. The method as recited in claim 2, further comprising:
    determining, based on the plurality of coefficients of the averaged block, an information spread indicating an importance of the plurality of coefficients to a visual structure of the digital image according to a number of coefficients in each bucket of the plurality of buckets; and
    establishing, based on the determined information spread, a maximum quantizer value for a coefficient from the plurality of coefficients of the averaged block.

5. The method as recited in claim 2, wherein creating the averaged block comprises
    averaging frequency information of the digital image by averaging a plurality of frequency domain coefficients at each location in a plurality of frequency domain blocks corresponding to the plurality of blocks of the digital image.

6. The method as recited in claim 5, further comprising:
    identifying a plurality of frequency domain coefficients corresponding to a common location in the plurality of frequency domain blocks, wherein the identified plurality of frequency domain coefficients correspond to a coefficient within the averaged block at the common location, and the coefficient within the averaged block at the common location is associated with a first bucket from the plurality of buckets;

determining that a predetermined percentage of the identified plurality of frequency domain coefficients corresponding to the common location meets a threshold associated with a second bucket from the plurality of buckets; and moving the coefficient within the averaged block at the common location from the first bucket to the second bucket.

7. The method as recited in claim 1, further comprising:
identifying a plurality of color space components associated with the digital image, the plurality of color space components comprising a first color space component and a second color space component; and
generating a custom quantization table for each color space component from the plurality of color space components, wherein a first custom quantization table for the first color space component is different than a second custom quantization table for the second color space component.

8. The method as recited in claim 1, further comprising:
providing a plurality of compression workflows, each compression workflow from the plurality of compression workflows comprising an image quality setting;
identifying a selection of a compression workflow from the plurality of compression workflows; and
wherein determining the plurality of compression error thresholds further comprises determining the plurality of compression error thresholds based on the image quality setting of the selected compression workflow.

9. The method as recited in claim 1, further comprising:
identifying a plurality of locations in the averaged block of the digital image;
determining an importance level of each location from the plurality of locations based on a position of the location within the averaged block;
assigning a weight to each location from the plurality of locations based on the determined importance level; and
wherein determining the plurality of compression error thresholds further comprises determining a compression error threshold for a coefficient within the averaged block based on the assigned weight for a corresponding location within the averaged block.

10. The method as recited in claim 9, further comprising generating an importance level map for each color space component from a plurality of color space components of the digital image, wherein the importance level map for each color space component comprises a plurality of importance levels for the plurality of locations.

11. A non-transitory computer readable storage medium comprising instructions that, when executed by at least one processor, cause a computer system to:
identify a digital image;
convert a plurality of blocks of the digital image to a frequency domain;
create an averaged block representing the plurality of blocks of the digital image in the frequency domain, the averaged block comprising a plurality of coefficients representing content in the digital image;
determine a plurality of compression error thresholds for the plurality of coefficients of the averaged block based on a location of each coefficient within the averaged block and a distribution of the plurality of coefficients within the averaged block;
generate a custom quantization table that produces a plurality of compression errors that meet the plurality of compression error thresholds for the digital image by assigning a plurality of quantizers to the plurality of coefficients based on the plurality of compression error thresholds; and
compress the digital image using the custom quantization table for the plurality of blocks.

12. The non-transitory computer readable storage medium as recited in claim 11, further comprising instructions that, when executed by the at least one processor, cause the computer system to:
compare the plurality of coefficients of the averaged block to a plurality of thresholds associated with a plurality of buckets; and
place a coefficient from the plurality of coefficients into a bucket from the plurality of buckets based on the coefficient meeting a threshold from the plurality of thresholds associated with the plurality of buckets.

13. The non-transitory computer readable storage medium as recited in claim 12, further comprising instructions that, when executed by the at least one processor, cause the computer system to:
identify, for the coefficient from the plurality of coefficients, a compression error threshold from the plurality of compression error thresholds based on the bucket in which the coefficient was placed;
select a quantizer for the coefficient that produces an error that meets the identified compression error threshold; and
assign the selected quantizer to a location corresponding to the coefficient in the custom quantization table.

14. The non-transitory computer readable storage medium as recited in claim 12, further comprising instructions that, when executed by the at least one processor, cause the computer system to:
convert the plurality of blocks of the digital image to the frequency domain to create a plurality of frequency domain blocks corresponding to the plurality of blocks of the digital image;
identify a plurality of frequency domain coefficients corresponding to a common location in the plurality of frequency domain blocks, wherein the identified plurality of frequency domain coefficients correspond to a coefficient within the averaged block at the common location, and the coefficient within the averaged block at the common location is associated with a first bucket from the plurality of buckets;
determine that a predetermined percentage of the identified plurality of frequency domain coefficients corresponding to the common location meets a threshold associated with a second bucket from the plurality of buckets; and
move the coefficient within the averaged block at the common location from the first bucket to the second bucket.

15. The non-transitory computer readable storage medium as recited in claim 11, further comprising instructions that, when executed by the at least one processor, cause the computer system to:
identify a plurality of color space components associated with the digital image, the plurality of color space components comprising a first color space component and a second color space component; and
generate a custom quantization table for each color space component from the plurality of color space components, wherein a first custom quantization table for the first color space component is different than a second custom quantization table for the second color space component.

16. The non-transitory computer readable storage medium as recited in claim 11, further comprising instructions that, when executed by the at least one processor, cause the computer system to:
provide a plurality of compression workflows, each compression workflow from the plurality of compression workflows comprising an image quality setting;
identify a selection of a compression workflow from the plurality of compression workflows; and
wherein determining the plurality of compression error thresholds further comprises determining the plurality of compression error thresholds based on the image quality setting of the selected compression workflow.

17. The non-transitory computer readable storage medium as recited in claim 11, further comprising instructions that, when executed by the at least one processor, cause the computer system to:
identify a plurality of locations in the averaged block of the digital image;
determine an importance level of each location from the plurality of locations based on a position of the location within the averaged block;
assign a weight to each location from the plurality of locations based on the determined importance level; and
wherein determining the plurality of compression error thresholds further comprises determining a compression error threshold for a coefficient within the averaged block based on the assigned weight for a corresponding location within the averaged block.

18. In a digital medium environment for compressing digital images, a system comprising:
at least one processor; and
a non-transitory computer readable storage medium comprising instructions that, when executed by the at least one processor, cause the system to:
identify a digital image;
convert a plurality of blocks of the digital image to a frequency domain;
create an averaged block representing the plurality of blocks of the digital image in the frequency domain, the averaged block comprising a plurality of coefficients representing content in the digital image;
determine a plurality of compression error thresholds for the plurality of coefficients of the averaged block based on a location of each coefficient within the averaged block and a distribution of the plurality of coefficients within the averaged block;
generate a custom quantization table that produces a plurality of compression errors that meet the plurality of compression error thresholds for the digital image by assigning a plurality of quantizers to the plurality of coefficients based on the plurality of compression error thresholds; and
compress the digital image using the custom quantization table for the plurality of blocks.

19. The system as recited in claim 18, further comprising instructions that, when executed by the at least one processor, cause the system to:
compare the plurality of coefficients to a plurality of thresholds associated with a plurality of buckets;
place a coefficient from the plurality of coefficients into a bucket from the plurality of buckets based on the coefficient meeting a threshold from the plurality of thresholds associated with the plurality of buckets; and
select a quantizer for the coefficient from the plurality of coefficients based on the bucket into which the coefficient was placed.

20. The system as recited in claim 18, further comprising instructions that, when executed by the at least one processor, cause the system to:
provide a plurality of compression workflows, each compression workflow from the plurality of compression workflows comprising an image quality setting;
identify a selection of a compression workflow from the plurality of compression workflows; and
generate the custom quantization table comprising the plurality of compression error thresholds based on the selected compression workflow.

* * * * *